United States Patent Office

3,012,981
Patented Dec. 12, 1961

3,012,981
WAX COMPOSITIONS CONTAINING TELEMERIC POLYALKYL OXOESTERS
John Podlipnik, Palos Heights, Ill., assignor to Sinclair Refining Company, New York, N.Y., a corporation of Maine
No Drawing. Filed July 1, 1958, Ser. No. 745,808
6 Claims. (Cl. 260—28.5)

The present invention relates to an improved paraffin wax composition particularly adapted to meet certain needs in coating cellulosic articles such as paperboard containers useful in the packaging of milk.

During the past several years considerable time and money have been expended in the development of various wax compositions suitable for use by the dairy industry such as for instance, in the packaging of milk in paperboard cartons. This work has been, to a large extent, directed to improving the resistance to bulging of the filled paper container due to a rippled coating and to the elimination of the tendency of the wax coating, due to its inflexibility, to crack and flake during the handling and storage of the milk. These difficulties have been overcome to a large extent by the addition of such materials as polyethylene, various cuts of microcrystalline waxes, various paraffin waxes, etc. to a base crystalline paraffin wax. There has, however, been an additional problem not satisfied by any of the commercially available wax coating compositions on the market today and that is the formation of V-shaped dry spots in the wax coating on the inside of the carton panels. These spots represent portions of the coating where no wax is deposited on the paperboard, which as in the case of ripples lead to excessive bulging.

The present invention provides a wax composition suitable for use on such containers and which when so applied results in a container substantially free of dry spots on the inside panels and which also provides good protection against flaking, cracking, and rippling. The present paraffin wax composition consists essentially of four ingredients which can be generally classified as a crystalline paraffin wax, a defined soft microcrystalline wax, polyethylene and a liquid telemeric polyalkyl oxoester. This composition can be applied to paperboard containers which are dipped into a melt of the wax, for instance, maintained at a temperature of about 155 to 190° F. The coated containers are withdrawn from the vat of melted wax and then cooled by contact with a flowing gas stream, e.g. air, preferably at a temperature of about 40 to 60° F. Paperboard presently employed in the industry such as sized and calendered paperboard produced by the Fourdrinier process and having a low moisture content, e.g. about 6 percent or less can be used as the base material for the wax coating.

The crystalline paraffin wax component of the instant composition can comprise about 72 to 92 weight percent of the blend, preferably about 80–85 weight percent and can be a fully or semi-refined wax. In general the wax can be obtained from paraffin base crude oils such as Pennsylvania crude or mixed base crudes and will have a melting point of about 120 to 155° F. and a maximum oil content (ASTM D–721–55T) of about 1 percent. To provide a composition of maximum utility the odor and taste of the paraffin wax should be nil.

The soft microcrystalline wax ingredient is employed in amounts of about 5 to 25 percent by weight, preferably about 12 to 18 weight percent of the composition, and has a petrolatum melting point (ASTM D–127–49) of about 90° F. to 160° F., a refractive index ($n_D^{70}$) at 70° C. of at least about 1.45, a viscosity at 210° F. of about 15 to 25 centistokes (ASTM D–445–53T) and not more than about 5.0 weight percent oil (ASTM 721–56T). The addition of this ingredient to the composition provides enhanced flexibility and adhesion properties to the final blend. The soft microcrystalline wax can be obtained from Pennsylvania and Mid-Continent petrolatums. This wax is relatively rich in cycloparaffins, compared to the petrolatum from which it is derived, the cycloparaffin content of the wax including both non-condensed and condensed cycloalkanes, usually being at least about 25 percent by weight. The soft microcrystalline wax which is utilized can be described as a "heart cut" of the parent petrolatum resulting from the removal of both the most oily components and the most crystalline, leaving the desired microcrystalline wax fraction. This fraction is generally obtained by various combinations of deoiling procedures using selective solvents such as for example, a mixture of methylethyl ketone, toluene and benzene.

The polyethylenes useful in the present invention can generally be any of those wax-compatible, i.e. soluble or dispersible, polyethylenes known to the art. For instance, they can be conventional polyethylenes of the general formula $C_nH_{2n}$ obtained by polymerizing the ethylene monomer; they can contain such groups as terminal —OH groups. Thus, the selection of the particular type of polyethylene, is of little moment. The main requirement is that its molecular weight be such that it is compatible in the wax composition. The polyethylene is incorporated into the wax compositions in order to overcome the sticking tendency of the soft, tacky microcrystalline wax, to eliminate the rippled, serpentine coating associated with straight petroleum wax, to give superior flexibility, tensile strength and adhesion to the coating, and to reduce penetration into the paperboard and therefore consumption of the wax. Generally the maximum concentration of the polyethylene in the wax composition is governed by the viscosity of the final blend which must be less than about 10 centistokes at 175° F., exceeding of which will result in high wax consumption, excessive buildup on coating machine parts and coatings having rough surfaces. Usually, however, the polyethylene concentration will not exceed about 4.0 percent by weight of the final blend. The minimum concentration of the polyethylene is generally controlled by flexibility and adhesion and will usually be at least about 0.5 percent by weight. The polyethylenes useful in the present invention in general have average molecular weights in the range of about 1,000 to 30,000; preferably the major portion not exceeding about 10,000 and in particular we prefer to use polyethylenes having an average molecular weight in the range of about 2,000 to 4,000. Although polyethylenes having molecular weights exceeding about 10,000 can be used they are generally to be avoided or minimized since flexibility may be adversely affected unless the blend viscosity is increased beyond the 10 centistokes value for obtaining minimum wax consumption. If, however, the higher molecular weight polyethylenes are used the concentration thereof in the total blend can with advantage be limited to a maximum of say about 0.5 weight percent for a 10,000 to 20,000 polyethylene and about 0.1 weight percent for a 20,000 to 30,000 polyethylene. If the proportions of these higher molecular weight polyethylenes materially exceed these values the coating may be rough, although the objectional dry spots and rippling would still be avoided. In any event the molecular weight of the polyethylene will usually lie in the range of about 1000 to 30,000 with the amount and molecular weight being selected to give a final composition having a viscosity of less than about 10 centistokes at 175° F.

The fourth essential ingredient of the present composition is a material characterized as being a wax compatible, liquid telomeric polyalkyl oxoester represented by the general structural formula

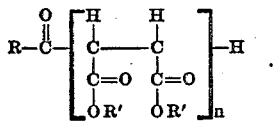

wherein R is an alkyl radical of from 1 to 12, preferably 2 to 6, carbon atoms, R' is an alkyl radical of from 1 to 18, preferably 4 to 12, carbon atoms and $n$ is an integer from 2 to 10. These compounds can be prepared by reacting together an aldehyde and an aliphatic ester of a 4-carbon atom monoethylenic, unsaturated dicarboxylic acid wherein the ethylenic linkage is conjugated with both carbonyl groups, in the presence of a free radical promoting agent such as ultraviolet radiation, acetyl peroxide, benzoyl peroxide, hydrogen peroxide, etc. For a description of the manner of preparing such compounds reference is made to U.S. Patent No. 2,647,920 issued to Patrick et al. It is preferred that the aldehyde be n-butyraldehyde and the aliphatic ester be di-2-ethylhexyl fumarate. Generally this component of the wax composition need be present in only minor concentrations of say for instance, about 10 to 100 parts per million, preferably about 20 to 30 parts per million. This component of the wax composition is imperative to satisfactory paperboard container production in that it eliminates the formation of bubbles and the V-shaped dry spots on the inside panels of the cartons; a condition which other agents fail to overcome.

The present invention can best be illustrated by the following specific examples.

In order to determine the effect of the various polyethylenes and the concentration thereof upon the wax composition of the instant invention several blends were prepared by mixing at elevated temperatures, e.g. 180° F., the following ingredients.

(1) 83 weight percent of a crystalline paraffin wax having the following physical characteristics:

| | |
|---|---|
| Gravity, ° API | 42.2 |
| ASTM M.P., ° F | 126.1 |
| Viscosity, cs./175° F | 4.675 |
| Percent oil | .17 |
| Penetration at— | |
| 77° F | 19 |
| 90° F | 41 |
| 100° F | 100 |
| Tensile strength at 73° F., p.s.i | 316 |
| Refractive index at 73° F | 1.4317 |

(2) 15 weight percent of a soft microcrystalline foots wax having the following physical characteristics:

| | |
|---|---|
| Gravity, ° API | 32.6 |
| Petrolatum M.P., ° F | 156 |
| Viscosity, cs./210° F | 17.1 |
| Percent oil | 0.6 |
| Penetration at 77° F | 68 |
| Refractive index at 70° F | 1.45785 |

(3) .0025 weight percent of a liquid telomeric polyalkyl oxoester ($n$ was approximately 5) prepared by reacting together di-2-ethylhexyl fumarate and n-butyraldehyde in the presence of benzoyl peroxide.

(4) Polyethylenes as indicated in Table I below: The above blends were applied to half-gallon milk containers in order to evaluate the effect of different polyethylenes and the concentrations thereof on the consumption characteristics of the wax as well as the physical appearance of the container after coating. The polyethylenes used are commercially available and they are listed in Table I below along with the results obtained. The base wax in the table is the mixture of ingredients 1, 2 and 3 above. The coating temperature in each case was 180° F.

Table I

| | Avg. mol. of polyethylene | Physical tests on blends | | Flexibility at 60° F.[1] | Tests on coated milk cartons | | Appearance of coating surface |
|---|---|---|---|---|---|---|---|
| | | Viscosity (ASTM D445-53T) | | | Wax consumption, lbs./1,000, ½ gal. cartons | | |
| | | CS/175°F. | CS/210°F. | | Carton A | Carton B | |
| Base wax | | 5.86 | 4.19 | 0.05 | 57.2 | 59.0 | Smooth. |
| Base wax plus— | | | | | | | |
| 1.0% polyethylene [2] | 2,000 | 6.51 | 4.63 | 0.10 | | | |
| 2.0% polyethylene | | 7.15 | 4.99 | 0.24 | 54.2 | 57.6 | Do. |
| 3.0% polyethylene | | 7.70 | 5.31 | 0.11 | | | |
| 1.0% polyethylene [3] | 2,000 | 6.66 | 4.54 | 0.06 | | | |
| 2.0% polyethylene | | 7.97 | 4.90 | 0.19 | 51.8 | 55.0 | Do. |
| 3.0% polyethylene | | 9.18 | 5.18 | 0.17 | | | |
| 1.0% polyethylene | 2,500 | 6.89 | 4.85 | 0.06 | | | |
| 2.0% polyethylene | | 7.51 | 5.32 | 0.10 | 51.1 | 53.3 | Do. |
| 3.0% polyethylene | | 8.58 | 5.94 | 0.12 | | | |
| 1.0% polyethylene | 4,000 | 6.59 | 4.71 | 0.13 | | | |
| 2.0% polyethylene | | 7.42 | 5.23 | 0.23 | 54.8 | 58.3 | Slightly rough. |
| 3.0% polyethylene | | 8.45 | 5.99 | 0.12 | | | |
| 1.0% polyethylene | 7,000 | 7.06 | 5.02 | 0.06 | | | |
| 2.0% polyethylene | | 8.38 | 6.05 | 0.19 | 54.9 | 59.1 | Smooth. |
| 3.0% polyethylene | | 11.01 | 6.86 | 0.26 | | | |
| 0.5% polyethylene | 12,000 | 8.29 | 4.91 | 0.04 | | | |
| 1.0% polyethylene | | | 5.59 | 0.06 | 52.5 | 54.6 | Rough. |
| 2.0% polyethylene | | 12.84 | 7.05 | 0.09 | 60.6 | 62.1 | Very rough. |
| 3.0% polyethylene | | 15.51 | 9.35 | 0.20 | | | |
| 0.25% polyethylene | 23,000 | 10.12 | 4.80 | 0.06 | 50.4 | 52.5 | Rough. |
| 0.50% polyethylene | | 13.53 | 5.68 | 0.07 | 61.9 | 66.6 | Very rough. |
| 1.00% polyethylene | | 13.45 | 7.04 | 0.09 | | | |
| 2.00% polyethylene | | ([3]) | 11.79 | 0.12 | | | |

[1] Values represent deflection at break—in inches determined by bending a beam of wax on an Instron tester at 2 in./min. crosshead speed.
[2] This polyethylene had terminal -OH groups.
[3] Can't run.

Inspection of these results indicate that any of the commercially available polyethylenes can be used. The cartons prepared with each of the compositions were substantially devoid of all bubbles and dry spots with good coatings being given, excepting, however, for a certain amount of roughness when higher molecular weights were used. Thus, in order to insure good coating in all respects including smoothness the molecular weight of the predominant amount of polyethylene should not exceed about 10,000 and preferably it should be less than about 4,000.

In order to evaluate the effectiveness of the present wax composition in eliminating the formation of dry spots in the wax coating after application to milk containers several compositions were prepared, and tested on half-gallon milk cartons. The procedure used in coating the cartons was as follows. The wax blend was placed in a dipping vat maintained at a temperature of between 165° F. and 180° F. to insure complete melting and fluidity of the mix. An unwaxed preformed paperboard container characterized by an approximate 3 to 6 weight percent moisture content was dipped in the wax vat and held there for about 10 seconds to insure complete coating of the container. The coated container was then removed from the vat and air cooled in flowing air at about 50° F. After about 40 seconds at 50° F. the wax had set sufficiently for testing purposes. The compositions tested were as follows:

COMPOSITION A

This composition was composed of about 90.25 weight percent crystalline paraffin wax having the characteristics set forth in (1) above; about 4.0 weight percent of a microcrystalline wax having a gravity of 33.9° API, a petrolatum melting point of about 170.6° F., a viscosity of about 24.27 centistokes at 175° F., and an oil content of about 1.45%; about 5.0 weight percent of a heavy lube distillate foot's wax having a gravity of about 38.1° API, an ASTM melting point of about 118.0° F., a viscosity of about 1.01 centistokes at 175° F. and a refractive index at 70° C. of about 1.4424; and about 0.75 weight percent of a tank bottoms microcrystalline wax having an ASTM melting point of about 197.5° F., penetration at 77° F. of 7. The physical characteristics of this blend were as follows:

Gravity, ° API _____ 42.1
ASTM M.P., ° F _____ 125.8
Petrolatum M.P., ° F _____ 136.2
Viscosity, cs./175° F _____ 5.105
Percent oil _____ .24
Penetration at—
  77° F _____ 17
  100° F _____ 76
Tensile strength at 73° F., p.s.i _____ 360
Refraction index at 70° C _____ 1.433

This blend was used as a standard of comparison since it has good properties regarding its resistance to flaking, cracking, serpentine, mottling and flexibility although cartons coated therewith have the characteristic dry spots.

COMPOSITION B

This composition is comprised of 83.0 weight percent of the paraffin wax set forth in (1) above, about 15 weight percent of the soft microcrystalline wax set forth in (2) above and about 2 weight percent of polyethylene having a molecular weight of about 2000.

COMPOSITION C

This composition is the same as composition B having added thereto .001 to .005 weight percent of the agent set forth in (3) above.

COMPOSITION D

Same as composition B having added thereto 0.001 to .002 weight percent of Dow Corning's Antifoam A which is a methyl silicone polymer absorbed on a silica gel base.

COMPOSITION E

Same as composition B having added thereto .001 weight percent Dow Corning's D.C.F. 200–100 fluid which is a liquid methyl silicone polymer having a viscosity of about 100 cs. at 25° C.

Composition A was applied to half-gallon milk containers in the manner set forth above so as to obtain data to check against the new wax and to see that the coating machines were operating properly. Data on the cartons for these tests are summarized in Table II below.

Table II
COMPOSITION A

| Carton | No. 1 | No. 2 |
|---|---|---|
| Properties of finished cartons: | | |
| Weight of carton, unwaxed | 61.0 | 59.9 |
| Weight of wax, grams | 28.9 | 26.0 |
| Weight of wax, lbs./1,000 cartons | 63.6 | 57.2 |
| Coverage, top flaps | Good | Fair |
| Dry spot rating, bottom [1] | 1 | 2 |
| Dry spot rating, top drain panel [1] | 0 | 2 |
| Dry spot rating, side panels [1] | 0 | 0 |
| Dry spot rating, bottom drain panel [1] | 0 | 0 |
| Coating smoothness | Good | Good |
| Bubbles | Few | Few |

[1] Rating used in all tables:
  0 = Excellent, no dry spots.
  1 = Very good
  2 = Good      Determined by number, size and position of dry
  3 = Fair      spots.
  4 = Poor
  5 = Very poor, over 75% of carton panel covered.

The cartons coated with this composition have good qualities with the exception, however, of the presence of bubbles and dry spots in the bottoms of all the cartons.

The new wax composition minus the oxoester additive (composition B) was tested on half-gallon milk cartons in order to compare its effectiveness with composition A. These data are summarized in Table III below.

Table III

| Carton | No. 1 | No. 2 | No. 3 |
|---|---|---|---|
| Properties of finished cartons: | | | |
| Weight of carton, unwaxed, gms | 63.4 | 58.5 | 60.3 |
| Weight of wax, gms | 22.4 | 29.8 | 24.5 |
| Weight of wax, lbs./1,000 cartons | 49.3 | 65.6 | 53.9 |
| Coverage, top flaps | Exc. | Good | Exc. |
| Dry spot rating, bottom | 1 | 0 | 0 |
| Dry spot rating, top drain panel | 2 | 1 | 0 |
| Dry spot rating, side panels | 1 | 0 | 0 |
| Dry spot rating, bottom drain panel | 0 | 0 | 0 |
| Coating smoothness | Good | Fair | Good |
| Bubbles on bottom of carton | (1) | (1) | (1) |

[1] Numerous bubbles.

It is to be noted that the containers coated with composition B compare very favorably with containers coated with composition A in coverage respects and in addition indicate a decrease in wax consumption; also coverage on the top flaps is improved to some extent. There were still, however, numerous air bubbles formed on the bottoms of the cartons along with dry spots none of which could be eliminated by varying immersion time in the wax, coating temperatures or the paperboard. Although the mottling was more pronounced on the cartons using composition B than composition A, this effect appears to be primarily a function of the properties of the paperboard container. This feature however is not considered objectionable by the dairy industry and hence is of little import.

When, however, cartons were prepared using composition C as the coating material the bubbles and dry spots on the cartons were eliminated, giving excellent wax coatings in all respects when applied to the paperboard container. The data for these cartons is set forth in Table IV below.

Table IV
COMPOSITION C

| Carton | No. 1 | No. 2 | No. 3 | No. 4 | No. 5 |
|---|---|---|---|---|---|
| Amount of agent (3) | .005 | .001 | .001 | .005 | .001 |
| Properties of finished cartons: | | | | | |
| Weight of carton, unwaxed | 62.4 | 58.9 | 61.6 | 61.8 | 60.9 |
| Weight of wax, grams | 22.9 | 26.1 | 21.9 | 24.0 | 23.0 |
| Weight of wax, lbs./1,000 cartons | 50.4 | 57.4 | 48.2 | 52.4 | 50.6 |
| Coverage, top flaps | Exc. | Good | Exc. | Exc. | Exc. |
| Dry spot rating, bottom | 0 | 1 | 0 | 0 | 0 |
| Dry spot rating, top drain panel | 0 | 0 | 0 | 0 | 0 |
| Dry spot rating, side panels | 0 | 0 | 0 | 0 | 1 |
| Dry spot rating, bottom drain panel | 0 | 0 | 0 | 0 | 0 |
| Coating smoothness | V.G. | Good | V.G. | V.G. | V.G. |
| Bubbles | None | None | None | None | None |

In addition to providing a container having the bubbles and dry spots eliminated therefrom, the addition of the telomeric oxoester to the wax composition B (composition C) gave a better surface appearance in that before addition the coating was slightly grainy whereas after addition the coating was much smoother. Here again, as in composition B mottling was noticeable but not detrimentally so. The composition also maintained its good consumption rate.

Two alternative polymer agents were tested in the composition in order to ascertain the effectiveness of the oxoester in eliminating the dry spots. They were Dow Corning Antifoam A and Dow Corning DFC 200-100 Fluid. The Antifoam A is a solid silica gel containing methyl silicone polymer and was added to the composition both by means of a solvent and directly into the wax whereas DFC 200-100 is a liquid methyl silicone polymer and was added directly to the wax as such. Neither of these agents proved effective in eliminating the dry spots or the bubbles in the instant composition as shown by the data summarized in Table V below.

Table V

|  | Composition D—Agent added directly to wax | | Composition D—Agent added in solvent | | Composition E |
|---|---|---|---|---|---|
| Agent concentration: | | | | | |
| Weight percent | 0.001 | 0.002 | 0.001 | 0.001 | 0.001 |
| Parts per million | 10 | 20 | 10 | 10 | 10 |
| Carton | No. 1 | No. 2 | No. 3 | No. 4 | No. 5 |
| Properties of finished carton: | | | | | |
| Weight of carton, unwaxed, gms. | 59.1 | 63.0 | 58.8 | 29.9 | -------- |
| Weight of wax, gms. | 28.0 | 23.3 | 28.2 | 15.2 | -------- |
| Weight of wax, lbs./100 cartons. | 61.6 | 51.3 | 62.0 | 33.4 | -------- |
| Coverage, top flaps | Fair | Exc. | Good | Exc. | Exc. |
| Dry spot rating, bottom.¹ | 1 | 1 | 0 | 0 | 0 |
| Dry spot rating, top drain panel.¹ | 3 | 1 | 2 | 0 | 3 |
| Dry spot rating, side panels.¹ | 1 | 0 | 1 | 0 | 3 |
| Dry spot rating, bottom drain panel.¹ | 0 | 0 | 0 | 0 | 3 |
| Coating smoothness | Poor | Fair | Poor | Exc. | Poor |
| Bubbles | (²) | (²) | (²) | (²) | (²) |

¹ Explanation of rating system given in Table II.
² Numerous.

As here shown cartons coated with the present wax composition using instead of the oxoester additive other agents fail to obtain relief from the presence of dry spots and bubbles. Additionally the cartons coated with these compositions had less desirable properties in respect to smoothness of coating and top flap coverage. In some cases, it will also be noted that the dry spot ratings were actually increased slightly by the use of these components.

From the above data it can readily be seen that by the present invention I have provided a wax composition which enables the production of paperboard cartons having improved properties in regard to the major problem of dry spot formation, as well as having excellent properties in all other respects, such as coating smoothness and wax consumption.

In addition to giving excellent coverage and the elimination of dry spots and bubbles, containers coated with the new composition containing the oxoester additive showed a greater deposition of wax on the top flaps of the container with no difficulty being encountered with heat sealing the flaps and no top leakers resulting on either quart or half-gallon containers. As revealed in Tables II and IV the consumption of the new wax was markedly less (about 10 to 12%) than given by composition A with coating temperatures of about 180° F. proving the most efficient.

Another composition was prepared using, however, as a base wax a crystalline paraffin wax having the following physical characteristics:

| | |
|---|---|
| Gravity, ° API | 42.2 |
| Viscosity, cs./175° F | 4.827 |
| ASTM, M.P., ° F | 128.2 |
| Percent oil | .03 |
| Penetration at— | |
| 77° F | 16 |
| 100° F | 86 |
| Refractive index at 70° C | 1.43215 |

In all other respects the ingredients were the same as set forth in composition C above, as were the amounts blended. This composition also resulted in a paperboard container substantially free of dry spots on the inside panels and having excellent coverage and resistance to flaking and cracking.

The microcrystalline wax component of the present invention can also be varied if desired. For instance, mircocrystalline waxes having higher percentages of lower melting components rich in cycloalkanes can be used. Thus, fractions identifiable by the following characteristics can be incorporated in the blend rather than that set forth specifically in (2) above:

| Microcrystalline wax | A | B |
|---|---|---|
| Viscosity, cs. at 210° F | 18.88 | 20.14 |
| Petrolatum M.P., ° F | 113.00 | 99.9 |
| Percent oil | 1.13 | 2.03 |
| Refractive index at 70° C | 1.4559 | 1.45725 |
| Cycloalkane content, percent | >50 | >50 |

The melting point of all these wax fractions depends primarily upon the extent of deoiling and removal of the lower melting components rich in the cycloalkanes. Thus, component (2) above having a cycloalkane content of about 30% has a higher melting point than waxes A and B and was prepared by more extensive conventional deoiling procedures than were waxes A and B.

I claim:

1. A wax composition consisting essentially of about 72 to 92 weight percent of a crystalline paraffin wax having a melting point of about 120° to 155° F. and a maximum oil content of about 1.0 weight percent, about 5 to 25 weight percent of a microcrystalline wax having a petrolatum melting point of about 90 to 160° F., a viscosity at 210° F. of about 15 to 25 centistokes, a minimum refractive index at 70° C. of about 1.45, and an oil content not exceeding about 5.0 weight percent, about 0.5 to 4 weight percent of polyethylene having an average molecular weight of about 1000 to 30,000 and about 10 to 100 parts per million of a liquid telomeric polyalkyl oxoester having the structural formula:

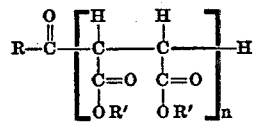

wherein R is an alkyl radical of from 1 to 12 carbon atoms, R' is an alkyl radical of from 1 to 18 carbon atoms and n is an integer from 2 to 10, said composition having a final viscosity not exceeding about 10 centistokes at about 175° F.

2. A wax composition as set forth in claim 1 wherein the polyethylene has an average molecular weight not exceeding about 10,000.

3. A wax composition as set forth in claim 1 consisting essentially of about 80 to 85 weight percent of the crystalline paraffin wax, about 12 to 18 weight percent of the microcrystalline wax, polyethylene of less than about 10,000 molecular weight and about 20 to 30 parts per million of the liquid telomeric polyalkyl oxoester.

4. A paperboard container coated with composition of claim 1.

5. A paperboard container coated with composition of claim 2.

6. A paperboard container coated with composition of claim 3.

References Cited in the file of this patent

UNITED STATES PATENTS

| | | |
|---|---|---|
| 2,642,366 | Rumberger | June 16, 1953 |
| 2,647,920 | Patrick et al. | Aug. 4, 1953 |
| 2,728,735 | Anderson | Dec. 27, 1955 |
| 2,733,225 | Smith | Jan. 31, 1956 |
| 2,758,100 | Bailly et al. | Aug. 7, 1956 |
| 2,791,570 | Backlund | May 7, 1957 |
| 2,808,382 | Jakoitis | Oct. 1, 1957 |